United States Patent

Burgin et al.

[11] Patent Number: 5,902,848
[45] Date of Patent: May 11, 1999

[54] POLYPROPYLENE FILMS SUITABLE FOR PACKAGING

[75] Inventors: Emanuele Burgin, Bologna; Nello Pasquini, Milan, both of Italy

[73] Assignee: Montell North America Inc., Wilmington, Del.

[21] Appl. No.: 08/811,308

[22] Filed: Mar. 4, 1997

Related U.S. Application Data

[63] Continuation of application No. 08/596,784, Feb. 5, 1996, abandoned, which is a continuation of application No. 08/358,280, Dec. 19, 1994, abandoned.

[30] Foreign Application Priority Data

Dec. 20, 1993 [IT] Italy ................................. MI93A2670

[51] Int. Cl.⁶ ................................ C08J 5/10; C08K 3/34; C08L 23/00
[52] U.S. Cl. ........................ 524/451; 524/425; 524/492; 524/493; 524/494; 524/445; 524/448; 524/497; 524/450
[58] Field of Search ..................... 524/451, 425, 524/492, 493, 494, 445, 448, 497, 450

[56] References Cited

U.S. PATENT DOCUMENTS

| | | | |
|---|---|---|---|
| 3,663,260 | 5/1972 | Poppe et al. | 117/47 A |
| 4,560,614 | 12/1985 | Park | 428/317.9 |
| 5,317,035 | 5/1994 | Jacoby et al. | 521/143 |
| 5,360,868 | 11/1994 | Mosier et al. | 525/89 |

FOREIGN PATENT DOCUMENTS

| | | |
|---|---|---|
| 206040 | 12/1986 | European Pat. Off. . |
| 301810 | 2/1989 | European Pat. Off. . |
| 323629 | 7/1989 | European Pat. Off. . |
| 2358439 | 2/1978 | France . |

*Primary Examiner*—James J. Seidleck
*Assistant Examiner*—U. K. Rajguru

[57] ABSTRACT

Disclosed are polyolefin films suitable for packaging having Elmendorf values lower than 0.8N in both machine direction and cross direction are obtained from compositions comprising (percentages by weight):

A) from 70% to 90% of a polyolefin matrix containing 30% of one or more crystalline propylene homopolymers and/or copolymers having a flexural modulus greater than or equal to 1800 MPa;

B) from 10% to 30% of one or more mineral fillers.

7 Claims, No Drawings

POLYPROPYLENE FILMS SUITABLE FOR PACKAGING

This application is a continuation of application Ser. No. 08/596,784, filed Feb. 5, 1996 now abandoned. this application is a continuation of application Ser. No. 08/358,280, filed Dec. 19, 1994, abandoned.

The present invention relates to polyolefin films suitable for packaging having specific Elmendorf values in both machine direction (M.D.) and cross (transverse) direction (T.D.).

Said films have been developed to be used in those packaging fields, the food field in particular, wherein the packaging must be easy to tear in all directions and the tear must occur in a given direction. For example, the above mentioned property is required for ready-to-use food packaging, such as for sweets, ice creams and milk derivatives, and up to now was achieved by using paper, cardboard and metallic foils.

The films of the present invention enable all of the previously used materials to be replaced, thus introducing in the above mentioned packaging field all of the advantages derived from the superior properties of olefin polymers, such as high chemical inertia, light weight, inexpensive production of the films and their inexpensive conversion into packaging, and above all, the fact that they are easy to recycle. In particular, the films of the present invention allow one to replace the multi-layered sheets of paper and metal, which involve considerable recycling problems.

Accordingly, the present invention provides films essentially made from a composition comprising (percentages by weight):

A) from 70% to 90%, preferably from 75% to 90%, more preferably from 75% to 85%, of a polyolefin matrix containing not less than 30%, preferably not less than 50%, most preferably not less than 70%, of one or more crystalline propylene homopolymers and/or copolymers having a flexural modulus (measured according to ASTM D 790 at 23° C.) greater than or equal to 1800 MPa, preferably greater than or equal to 1900 MPa, most preferably greater than or equal to 2000 MPa;

B) from 10% to 30%, preferably from 10% to 25%, more preferably from 15% to 25%, of one or more mineral fillers.

Said films possess Elmendorf values (measured according to ASTM D 1922) lower than 0.8N, in particular ranging from 0.3 to 0.8N, preferably from 0.3 to 0.5N, both in the machine and cross direction, therefore they tear easily in any direction. In fact, in order to be able to tear the film easily the Elmendorf values, which represent the tear strength offered by the film to the tear propagation, must be relatively low. In order for the above property to be about equal in any direction (isotropy), the Elmendorf values in the machine direction and cross direction must be comprised within a very narrow interval, thus avoiding the possibility that the tear propagation occur in a preferential direction (i.e., in the direction which is characterized by lower Elmendorf values).

It is preferred that the films of the present invention be nonoriented, i.e. that they be cast films. The thickness of the films generally ranges from 50 to 150 micrometers, and preferably from 90 to 120 micrometers.

Preferably, the crystalline propylene homopolymers and copolymers present in matrix A) have an isotactic index greater than or equal to 94%, more preferably greater than or equal to 96%, measured in xylene at 25° C. In fact, by polymerizing in one or more stages with highly stereospecific Ziegler-Natta catalysts, one can obtain crystalline propylene homopolymers and copolymers having flexural modulus values even higher than 2000 MPa in correspondence to the above mentioned isotactic index values. Moreover, the molecular weight distribution of the above mentioned high modulus propylene polymers is generally broad, preferably with Mw/Mn values ranging from 7 to 30 (wherein Mw and Mn refer to the weight average molecular weight and number average molecular weight respectively).

The above mentioned crystalline propylene copolymers can contain one or more comonomers selected from ethylene and/or $C_4$–$C_8$ α-olefins. Examples of $C_4$–$C_8$ α-olefins are: 1-butene, 1-pentene, 1-hexene, 3-methyl-1-pentene, 4-methyl-1-pentene, 1-octene. In order to maintain high flexural modulus values it is better that the content of comonomers in the copolymers be low, generally less than or equal to 10% by weight, in particular less than or equal to 5% by weight.

Matrix A) can also contain up to 70% by weight of one or more conventional olefin polymers, i.e. having a flexural modulus lower than 1800 MPa, selected in particular from the polymers and copolymers of ethylene, propylene and $C_4$–$C_8$ α-olefins. Preferred examples are isotactic polypropylene and crystalline copolymers of propylene containing up to 15% by weight of ethylene and/or $C_4$–$C_8$ α-olefins. Specific examples of $C_4$–$C_8$ α-olefins have been already given in reference to the high modulus propylene polymers.

The mineral fillers B) are preferably introduced in the compositions which essentially constitute the films of the present invention in the form of a concentrate in one or more of the above said conventional olefin polymers. The weight content of the fillers in the concentrate is preferably from 40% to 80%.

Obviously, the Melt Flow Rate (MFR) of the compositions which essentially constitute the films of the present invention must be suited for film production. Generally speaking the MFR L (measured according to ASTM D 1238 condition L) of the above mentioned compositions ranges from 3 to 15 g/10 min.

Specific examples of mineral fillers B) are talc, calcium carbonate, silica, clay, diatomaceous earths, titanium oxide, and zeolites. The preferred one is talc.

The particle size of the mineral filler is not particularly critical; for example, with particular reference to talc, one can use particles having an average diameter ranging from about 0.5 to 40 micrometers.

Besides the mineral fillers, the composition which essentially makes up the films of the present invention may contain the additives commonly used for polyolefins, such as stabilizers and pigments.

The above composition can be prepared by using known techniques starting from pellets, or powders, or polymer particles obtained from the polymerization process, that are preferably preblended in the solid state (with a Banbury, Henshel or Lodige mixer, for example) with the filler or fillers B), thus obtaining a dry blend which can be pelletized in an extruder using conventional techniques. It is also possible to feed the dry blend directly into the film processing systems.

The films of the present invention are obtained from the above mentioned composition by using the well known processes for polyolefin films production.

In particular, the cast films can be prepared by using flat die extruders, operating, for example, at temperatures ranging from 200° C. to 280° C.

For the uses described above, the films of the present invention can be subjected to finishing processes, such as metallization, which is carried out by depositing metal powders (such as aluminum, for example), under vacuum, on at least one of the film surfaces properly treated (by corona discharge, for example). The metallic layer thus obtained is generally from 1 to 5 micrometers thick.

The packagings can easily be obtained starting from the films, which are cut into the proper size and then glued or thermobonded (optionally after the addition of a layer of a heat-sealing material). The following example is given in order to illustrate but not limit the present invention.

EXAMPLE

Using a Henshel mixer a dry blend of the following components, in the form of extruded pellets, is produced:

1) 66.6% by weight of a propylene homopolymer having isotactic index of 98.5%, flexural modulus of 2300 MPa and MFRL of 3.7 g/10 min;
2) 33.4% by weight of a concentrate comprising 65% by weight of talc, 5% by weight of titanium dioxide and 30% by weight of a propylene homopolymer having isotactic index of 96.5%, flexural modulus of 1600 MPa and MFRL of 400 g/10 min.

The dry blend thus obtained is fed to a single screw extruder having a screw length/diameter ratio of 30 and extruded into film by means of a flat die with a 1 mm slit.

The temperature in the extruder cylinder is 240°–250° C.; the temperature of the extruder die is 250° C. The winding speed of the film is 46 m/min.

A 100 micrometers thick film is obtained which has a paper-like appearance, is opaque and has no tears.

The Elmendorf test is carried out on said film and the results are 0.4N in machine direction and 0.5N in cross direction.

Other features, advantages and embodiments of the invention disclosed herein will be readily apparent to those exercising ordinarily skill after reading the foregoing disclosures. In this regard, while specific embodiments of the invention have been described in considerable detail, variations and modifications of these embodiments can be effected without departing from the spirit and scope of the invention as described and claimed.

We claim:

1. A polyolefin film comprising a composition consisting essentially of, by weight:
   A) from 70% to 90%, based on the total weight of the composition, of a polyolefin matrix containing not less than 30% of a propylene polymer selected from the group consisting of (1) one or more crystalline propylene homopolymers, (2) one or more crystalline propylene copolymers having a comonomer content of less than or equal to 10%, and (3) mixtures thereof, the propylene polymer having a flexural modulus greater than or equal to 1800 MPa;
   B) from 10% to 30%, based on the total weight of the composition, of one or more mineral fillers selected from the group consisting of talc, calcium carbonate, silica, clays, diatomaceous earths, titanium oxide, and zeolites, said film being nonoriented and having an Elmendorf value of 0.3 to 0.8N in both the machine and cross directions.

2. The polyolefin film of claim 1 in the form of cast film.

3. The polyolefin film of claim 1, wherein the propylene crystalline copolymers having a flexural modulus greater than or equal to 1800 MPa contain one or more comonomers selected from the group consisting of (a) ethylene, (b) $C_4$–$C_8$ α-olefins, and (c) ethylene and $C_4$–$C_8$ α-olefins.

4. The polyolefin film of claim 1, wherein the propylene crystalline homopolymers and copolymers present in matrix A) and having a flexural modulus higher than or equal to 1800 MPa have an isotactic index higher than 94%.

5. The polyolefin film of claim 1, wherein matrix A) contains up to 70% by weight of one or more homopolymers or copolymers of ethylene, propylene and $C_4$–$C_8$ α-olefins, having a flexural modulus lower than 1800 MPa.

6. The polyolefin film of claim 5, wherein the homo- or copolymers having a flexural modulus lower than 1800 MPa are selected from isotactic polypropylene and propylene crystalline copolymers containing up to 15% by weight of a comonomer selected from the group consisting of (a) ethylene, (b) $C_4$–$C_8$ α-olefins, and (c) ethylene and $C_4$–$C_8$ α-olefins.

7. The polyolefin film of claim 1, wherein the crystalline propylene copolymer has a comonomer content of less than or equal to 5%.

* * * * *